United States Patent [19]

Maples

[11] Patent Number: 5,199,684
[45] Date of Patent: Apr. 6, 1993

[54] DISCHARGE VALVE FOR DISSOLVED AIR FLOTATION

[75] Inventor: William A. Maples, Appleton, Wis.

[73] Assignee: Microlift Systems Inc., Sturgeon Bay, Wis.

[21] Appl. No.: 870,933

[22] Filed: Apr. 20, 1992

Related U.S. Application Data

[62] Division of Ser. No. 669,667, Mar. 14, 1991, Pat. No. 5,139,663.

[51] Int. Cl.⁵ .......................... F16K 31/42; F16K 1/36
[52] U.S. Cl. .................................. 251/30.01; 251/31; 137/625.65
[58] Field of Search .............................. 251/30.01, 31; 137/625.65

[56] References Cited

U.S. PATENT DOCUMENTS 1,025,559  5/1912  Bliss .......................... 137/625.65 X
2,830,785  4/1958  Buri ..................................... 251/31 X
3,907,248  9/1975  Coulbeck .......................... 251/31 X

*Primary Examiner*—Arnold Rosenthal
*Attorney, Agent, or Firm*—Whyte & Hirschboeck

[57] ABSTRACT

A self-cleaning valve for discharge of a pressurized dissolved air flotation aqueous treatment liquid from a high pressure reservoir to a low pressure body of liquid to be treated is provided. The valve includes a discharge head body adapted to be attached to a conduit supplied with pressurized treatment liquid which is provided with a central opening for discharge of a treatment liquid. The opening is controllable by means of a reciprocable cap positioned to reciprocate from a position whereon it restricts flow of liquid through the opening to a position wherein flow in unrestricted. The cap is attached to a reciprocable piston rod attached at its opposite end to a piston that is movable within an enclosed cylinder. The cylinder is provided with a port or opening on each side of said piston into which a source of pressurized air connectable to cause movement of the piston and thus opening and closing of the valve by selectively directing the flow of said pressurized air to either side of the piston. A variable pressure regulating means can be provided to regulate the amount of flow through the valve.

8 Claims, 3 Drawing Sheets

DISCHARGE VALVE FOR DISSOLVED AIR FLOTATION

This is a division of copending application Ser. No. 07/669,667 filed on Mar. 14, 1991, now U.S. Pat. No. 5,139,663 dated Aug. 18, 1992.

BACKGROUND OF THE INVENTION

1. Field of the Invention

The present invention relates generally to systems using dissolved air flotation as a means for purification of liquids. More particularly, the present invention relates to discharge valves or nozzles for dissolved air flotation treatment units. Even more specifically, the present invention relates to a self-cleaning valve for discharge of a stream into a vessel of water to be treated, wherein the stream is pressurized and either saturated or supersaturated with oxygen or air and wherein the water to be treated is maintained at a lower pressure.

2. Description of Related Art

Various processes referred to as dissolved air flotation (DAF) systems have been developed and employed to clean or partially clean contaminated liquids by utilizing dissolved gases. The treatment liquid usually contains dissolved oxygen, at a saturated or supersaturated level. See, for example, U.S. Pat. No. 4,956,080 issued to MICROLIFT SYSTEMS, INCORPORATED of Sturgeon Bay, Wis. on Sep. 11, 1990.

In such processes, the treatment liquid frequently is maintained at an elevated pressure and the effluent or other material being treated is kept at a reduced or ambient pressure. The pressurized treatment liquid is introduced into the effluent, thereby allowing the treatment liquid to depressurize. During pressure reduction, bubbles of air or gas are formed as the gas is released from solution. The bubbles float to the top of the treated liquid, carrying particles and other various contaminants. To control the rate at which the treatment flows into the low pressure effluent, a discharge head, discharge valve, pressure reduction valve having a restriction is used.

A common problem encountered in DAF systems is that the treatment fluid is (in the case of fully pressurized or full forward flow systems) raw influent or, at least in part, recycled or partially cleaned effluent. This liquid may still contain some particulate contaminants. Thus, the discharge heads or valve mechanisms may become clogged with these contaminants or other particulate matter. Cleaning can only be accomplished by shutting down the entire DAF system to access the clogged mechanism. A valve or discharge head capable of self-cleaning by periodic purging would reduce system shutdowns, and therefore would represent a significant advancement in the art.

A second and common problem encountered is the normally fixed and manually only adjustable nature of existing discharge heads, discharge valves, or pressure reduction valves used for this purpose. Thus, as the heads or valves become clogged with particulate, they also become restricted and the flow or liquid throughput becomes less. Readjustment of flow (further opening of the valve) becomes a manual operation requiring periodic human intervention and adjustment. A discharge head or valve capable of remote adjustment, and even automatic adjustment by remote control, would reduce maintenance time. Additionally, a remote controlled piston-operated head or valve allows for adjustment of various flows without mechanical human adjustment with wrenches or the like during initial system set-up or subsequent system rebalancing required in many cases because of varying system flow requirements.

OBJECTS AND SUMMARY OF THE INVENTION

It is the primary object of the present invention to provide an improved, self-cleaning, liquid discharge nozzle assembly.

Another object of this invention is to provide a liquid discharge nozzle assembly which is capable of being adjusted from a remote location for varying flow rates.

How these and other objects and advantages of the present invention are accomplished will become apparent to one presently of ordinary skill in the art after reading the following description of the preferred embodiment in conjunction with the drawing FIGURES. Generally, however, the objects are accomplished by means of an improved non-clogging, self-cleaning valve for discharge of a pressurized dissolved air flotation aqueous treatment liquid from a high pressure reservoir to a low pressure body of liquid to be treated. The valve includes a discharge head adapted to be attached to a conduit supplied with pressurized treatment liquid. The valve body also has a central opening for discharge of the treatment liquid into the effluent.

Flow through the opening is controlled by a cap movable between fully closed and fully opened positions. In its closed position, the cap substantially restricts or prevents flow of treatment liquid through the central opening. In its fully opened position, the cap permits generally unrestricted flow through the opening. Flow through the valve with the cap in its fully opened position purges, and thereby cleans the valve.

The cap is attached to one end of a rod having a piston at its opposite end. The piston reciprocates within an enclosed cylinder. The cylinder is provided with ports to allow pneumatic or hydraulic adjustment of the piston's position within the cylinder. A source of pressurized air or fluid is connected to the cylinder, permitting control of valve position. Variable pressure control means allows valve control from a remote location.

DESCRIPTION OF THE DRAWINGS

In the FIGURES, like reference numerals are used to indicate like components.

DETAILED DESCRIPTION OF THE PREFERRED EMBODIMENT

General Configuration and Operation of Valve

Figure 1:
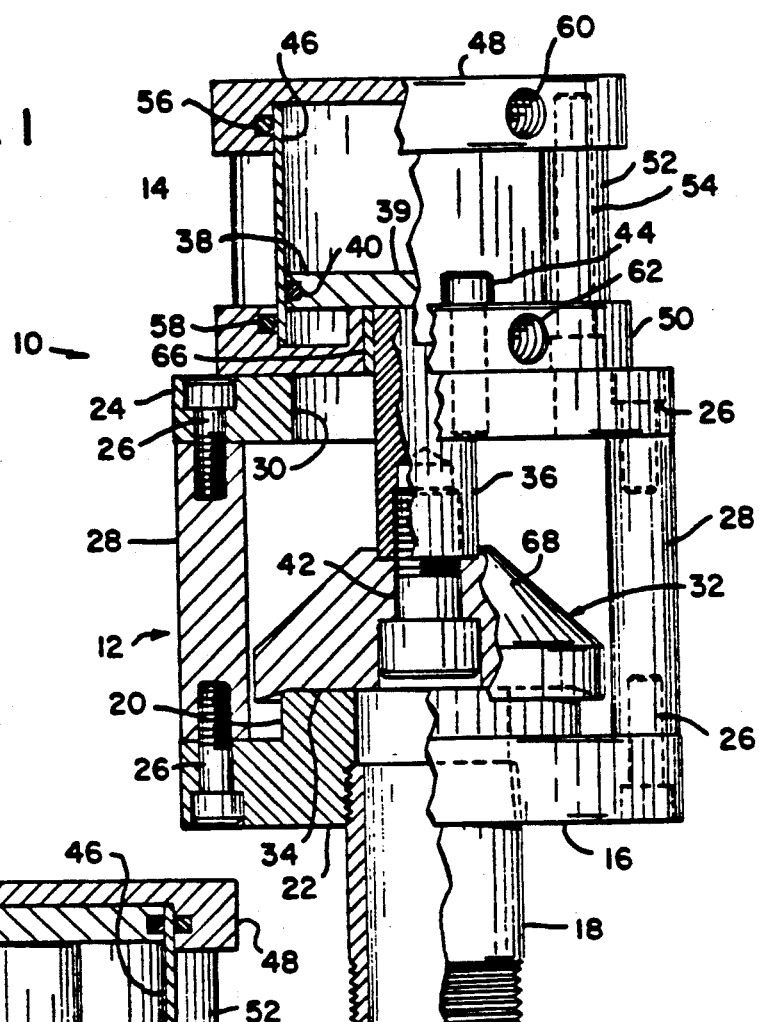
FIG. 1 is a side elevational view, partly in section, of a valve assembly of the present invention in the fully closed position with the cylinder shown in cross section.
Figure 2:
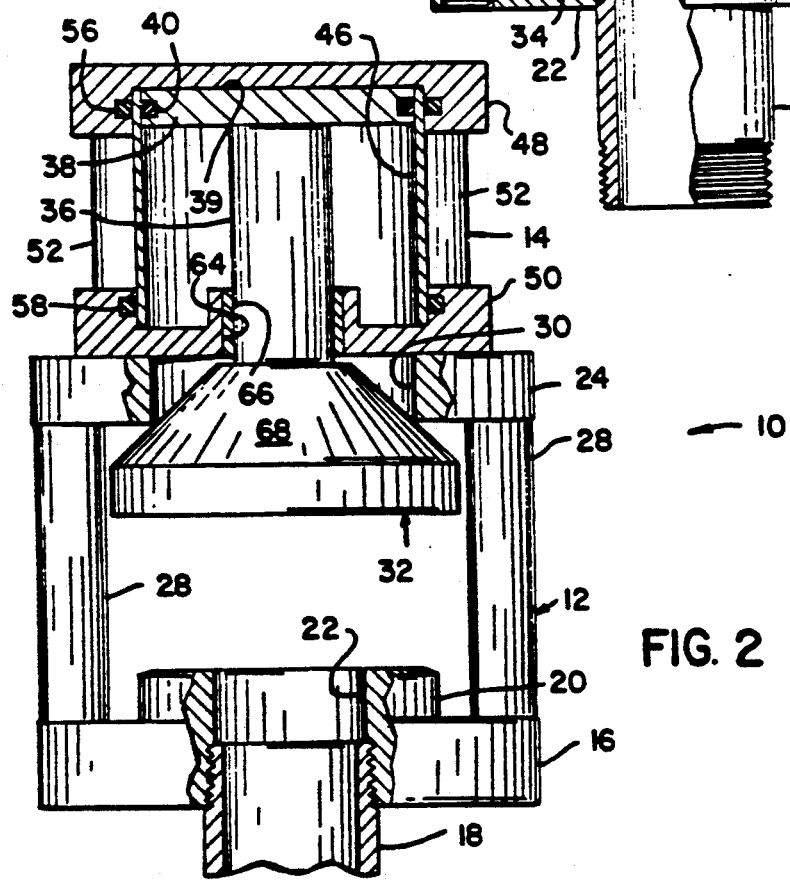
FIG. 2 is a side elevational view of a valve assembly of the present invention in the fully open position with the cylinder shown in cross section.

Referring to FIGS. 1 and 2, a self-cleaning valve assembly 10 of the present invention includes a head assembly 12 and a cylinder assembly 14. Head assembly 12 includes a base member 16 having a short pipe nipple 18 threaded thereto and adapted, at its opposite end, to be threaded to a line supplying DAF treatment liquid. In the preferred embodiment, a raised annular shoulder 20 surrounds the discharge end of central opening 22.

Head assembly 12 also has an upper plate member 24 secured to base member 16 by screws 26 and spacers 28. The reason for spacing between base member 16 and plate member 24 will be explained in more detail below. Upper plate 24 is generally circular in the preferred embodiment and defines a concentric circular opening 30.

To control the flow of liquid through opening 22, a valve cap 32, preferably circular in cross section, is normally positioned, as shown in FIG. 1 to rest upon and cover the annular shoulder 20. The lower surface 34 of the valve cap 32 is designed to engage shoulder 20 to prevent fluid flow through opening 22. The valve cap 32 is affixed to a central rod 36 having a piston head 38 attached by appropriate means to its upper end. Piston head 38 has an O-ring 40 annularly secured about it to prevent leakage between chambers in cylinder 14. In the preferred embodiment, cap 32 is secured to rod 36 by means of a cap screw 42.

Cylinder assembly 14 is secured above the valve cap 32 to the plate member 24 by bolts 44. Cylinder assembly 14 has an inner sleeve 46, an upper plate 48 and a lower plate 50. Plates 48, 50 rigidly hold the sleeve 46 and are maintained in spaced relation by spacers 52 and bolts 54. Plates 48, 50 also use O-rings 56 and 58, respectively, to seal sleeve 46. In the preferred embodiment, plates 48, 50 each have a port 60, 62, respectively. The purpose of ports 60, 62 will be explained in more detail below. Lower plate 50 has an opening 64 into which a smaller sleeve 66 is fitted. Rod 36 is axially slidable with respect to the the sleeve 66 upon more piston head 38 is moved. The diameters of sleeve 66 and rod 36 are such that there is neither leakage from cylinder 14, nor contamination of cylinder 14 by effluent or other material outside cylinder 14.

As seen in FIG. 1, when valve 10 is in its fully closed position, cap 32 engages annular shoulder 20, preventing fluid flow out of opening 22. In this position, piston head 38 is in its lower extreme position in cylinder 14. Conversely, as seen in FIG. 2, when valve 10 is in its fully opened position, the cap 32 is fully retracted, permitting relatively unrestricted fluid flow through opening 22. In this open position, piston head 38 is in its upper extreme position within cylinder 14. Additionally, the opening 30 in upper plate 24 accommodates an upper portion of the frusto-conical surface 68 of cap 32. This configuration assists in minimizing the overall height of valve 10.

Movement of piston head 38, and cap 32, is accomplished by providing air or some other fluid under pressure to either of ports 60, 62. The extent of travel of cap 32 allowed is determined by spacers 28 and the extent of travel of piston head 38 in cylinder 14. In the preferred embodiment, the size of spacers 28 are determined by the distance piston head 38 travels between its extreme positions.

Fluid from a reservoir (not shown) supplied to port 60 urges the piston head 38 downwardly with respect to FIGS. 1 and 2, lowering cap 32 thereby closing valve 10. If fluid is supplied to port 62, cap 32 is raised and valve 10 opened. By selectively balancing the relative pressure between the top side (non-rod end) of piston head 38 and the force created by fluid flow exiting opening 22, cap 32 can be maintained in an intermediate position to provide a preselected flow rate through opening 22. Means for accomplishing this will be discussed in more detail below in connection with a complete DAF system such as the one shown in FIG. 3.

Use of Valve in DAF System

Figure 3:
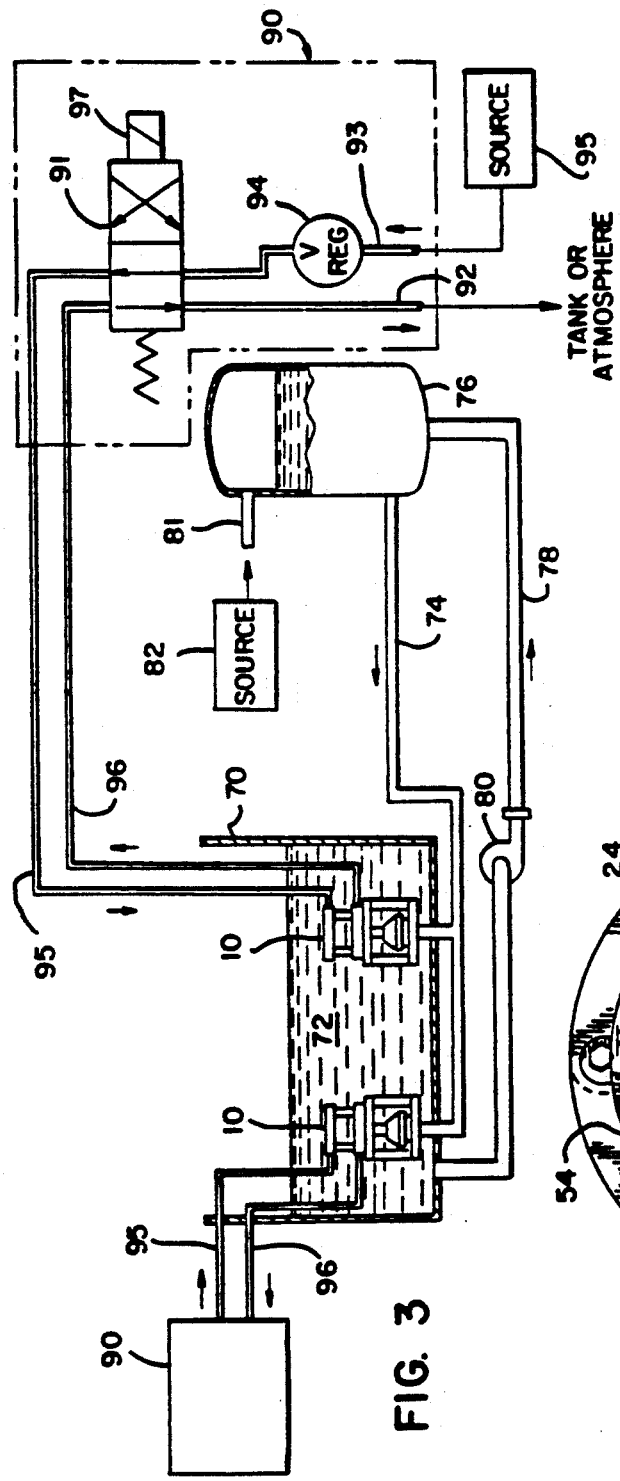
FIG. 3 is a schematic view showing valve assemblies of the present invention in a DAF tank showing flow lines and control systems for a complete system incorporating the valve assemblies.
Figure 4:
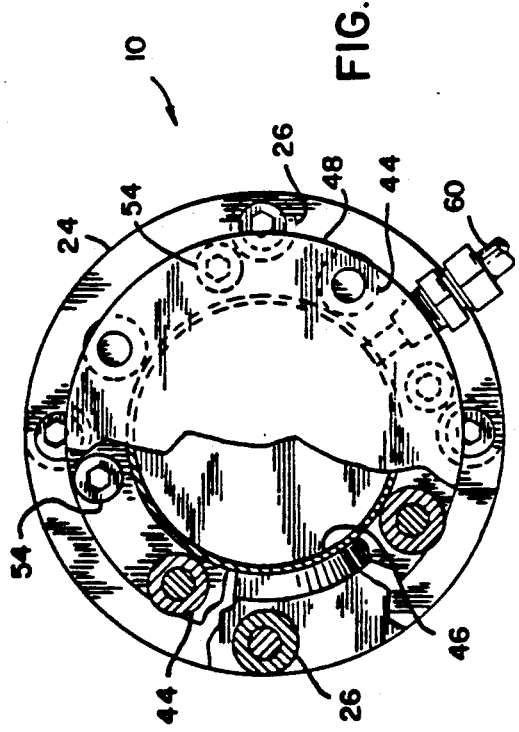
FIG. 4 is a top view of the valve assembly of the present invention showing parts of the assembly broken away.

A DAF system using the present invention is shown in FIG. 3. A plurality of valves 10 constructed in accordance with the present invention, are situated in a DAF tank 70. The valves 10 are positioned near the bottom of tank 70 and below the surface of effluent 72. Valves 10 are thus able to provide pressurized treatment fluid containing dissolved air or gas to as much effluent as possible. It should be noted that the valve 10 of the present invention can also be mounted in other than a vertical orientation and still accomplish the objects of the present invention. For example, the valves 10 of FIG. 3 may be mounted horizontally to the side wall of tank 70. Treatment fluid is supplied to tank 70 via line 74 from an effluent pressurization tank 76.

Fluid into which air or gas is to be dissolved is obtained from tank 70 via line 78. A suitable pump 80 can be used to supply tank 76. Air or some other gas containing oxygen is supplied under pressure via line 81 from a source 82. Fluid leaving pressurization tank 76 by line 74 has air or gas under pressure dissolved in it. This treatment fluid encounters lower pressure when it is released through valves 10 into tank 70.

As described in detail above, the rate of treatment fluid flow is regulated by valves 10. The regulator cap 32 of each valve 10 is set at an appropriate displacement from opening 22 to achieve the desired flow rate. Adjustable controls 90 determine cap displacement in each valve 10. All of the valves 10 in a given DAF tank 70 may be connected to the same control 90. However, since adjustments to individual valves 10 may optimize the DAF process, the preferred embodiment of the system provides separate controls 90 for each valve 10. Separate valve controls 90 also permit cleaning of individual valves 10 without requiring all valves 10 to be purged.

Each control 90 includes a reversible valve 91 normally biased as shown. In the position of valve 91, shown in FIG. 3, line 92 acts as an exhaust. When the control 90 is pneumatic, this exhaust 92 exits to atmosphere. When a hydraulic control system is used, line 92 may exit a collection tank at atmospheric pressure. Again, in the position of valve 91 shown in FIG. 3, line 93 supplies either air (in a pneumatic system) or hydraulic fluid (in a hydraulic system) to the valves 10. An adjustable pressure regulator 94 is situated between source 95 and valve 91 to regulate air or hydraulic fluid supplied to valves 10. Regulator 94 allows an operator to remotely control the flow of treatment fluid from pressurization tank 76 into DAF tank 70.

Figure 5:
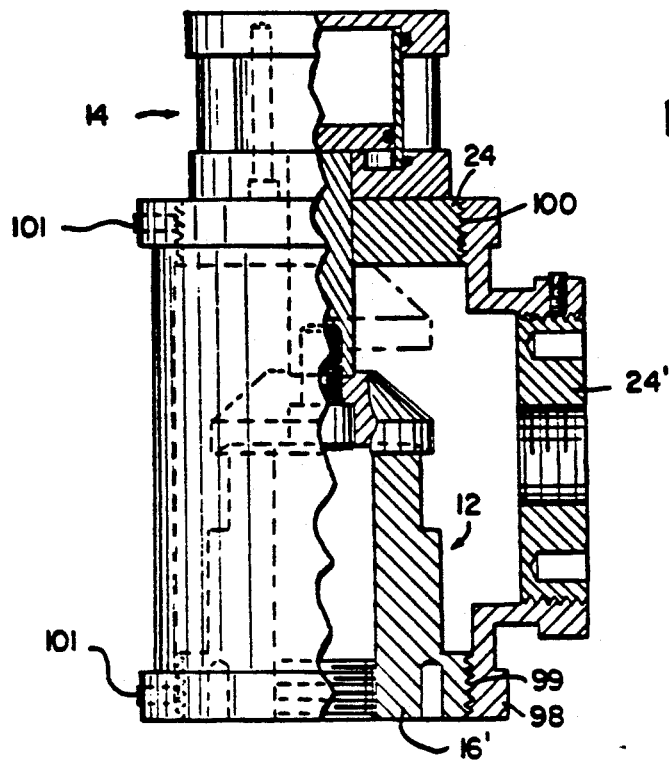
FIG. 5 illustrates an in-pipe, 90° valve alternate arrangement.
Figure 6:
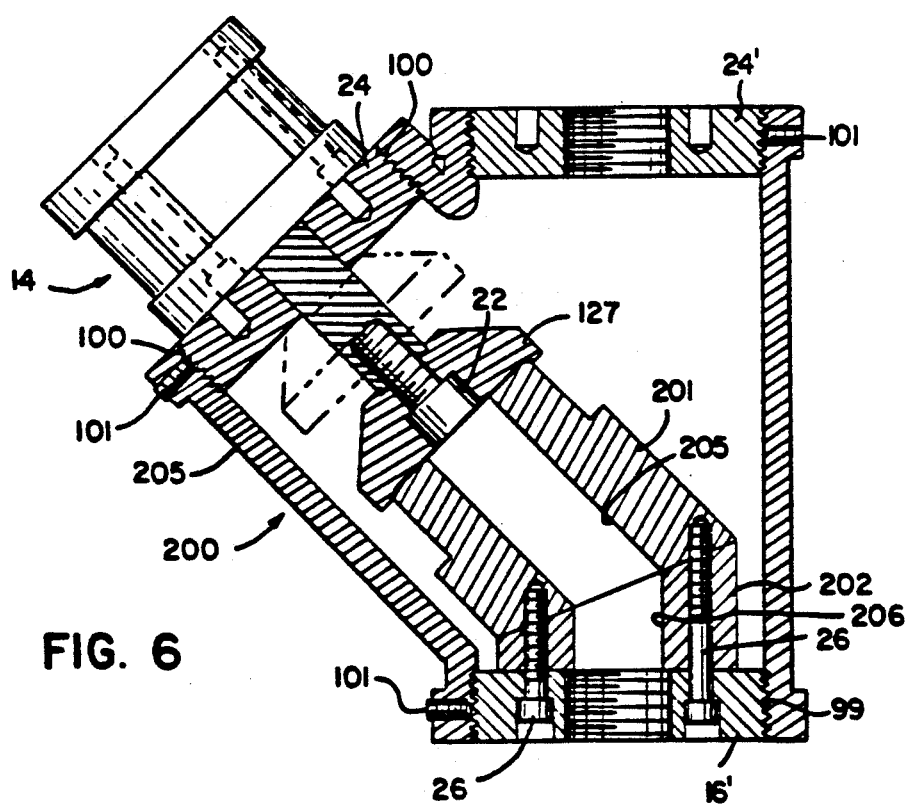
FIG. 6 illustrates an in-pipe, in-line valve alternate arrangement.

Additionally, FIGS. 5 and 6 illustrate alternate valve designs and arrangements allowing valve placement in a conduit 74, rather than inside tank 70. An existing common practice is to place the pressure reduction valve outside the tank to facilitate cleaning and adjustment. Both of these issues are addressed in the alternate, in-line, versions of FIGS. 5 and 6.

With attention being drawn to the embodiment of FIG. 5, it will be observed that the head assembly 12 may be seated within a 90° pipe fitting 98 with minimal modification. That is, the outer surface of the base member 16 may be threaded at 99 to accommodate the internal threads of the fitting 98. A similar modification of the upper plate member 24 provides external threading 100 received by the internal threads of the upper portion of the fitting 98. Set screws 101 may be provided to additionally retain the threaded members with respect to one another. In other respects, the operation, as above described will be substantially the same. The 90° fitting permits mounting of the head 12 externally of the tank 70.

It will also be observed from FIG. 6 that a modified valve head 12′ may be positioned within an in-pipe, in-line "Y" pipe fitting 200. The operation of the head assembly 12′ is substantially identical as above described in connection with the head assembly 12. The assembly 12′ is modified at its upper end in portion to include the external threads 100 on the upper plate member 24′ and the external threads 99 on the base member 16′. Intermediate mounting elements 201 and 202 are provided to permit angular mounting of the head assembly 12′ with respect to the angularly offset leg 205 of the "Y" fitting 200. It will be obvious that the mounting elements 201 and 202 may be fabricated from a single piece if so desired. Each of the elements include a registering thru bore 205 and 206. The bore 205 is an axial register with the central opening 22 of the annular shoulder 20.

Operation of the embodiments of FIGS. 5 and 6 is substantially the same as previously described in connection with the embodiment of FIGS. 1 and 2. The main difference lies in the immersion of the head assembly 12 within the confines of a fitting containing the effluent 72.

With valve 91 positioned as shown in FIG. 3, line 95 creates downward pressure on piston head 38. When valve 91 is switched to its reversed position, line 96 (normally the exhaust line from valve 10) becomes the pressure supply line. When pressure is supplied from regulator 94 in this mode, upward pressure is created on piston head 38. The setting of reversible valve 91 is controlled by a solenoid 97 in the preferred embodiment. By way of example, solenoid 97 may be manual or electric. By utilizing a timing head electric solenoid, automatic cycle purging may be additionally accomplished.

Valve 91 may be switched to its reverse setting when increased treatment fluid flow is desired or when cleaning of valves 10 by purging is being performed. In addition, intermediate settings of valves 10 by controls 90 can regulate treatment fluid flow in various sectors of DAF tank 70.

It will be obvious to one presently of ordinary skill in the art, after reading this specification, that modifications may be made to the present invention. For example, the valve of the present invention can be constructed of rigid plastic or noncorrosive metal. In addition, mounting of the valve may be accomplished in a number of ways. The valve can be connected to the conduit by threading as shown in the preferred embodiment, or, alternatively, by plastic socket weld, flange connection or any other commonly used piping connection. Accordingly, the present invention is not to be limited by the description or illustration of the preferred embodiment, but is to be limited solely by the scope of the claims which follow.

What is claimed:

1. A self-cleaning valve for discharge of a pressurized dissolved air flotation aqueous treatment liquid from a high pressure reservoir to a low pressure body of liquid to be treated comprising:
    a) a discharge head assembly adapted to be attached to a conduit supplied with pressurized treatment liquid and being provided with a central fluid discharge opening;
    b) a reciprocable cap positioned to reciprocate from a position whereon it restricts flow of liquid through said central opening to a position wherein flow through said opening is unrestricted;
    c) said cap being attached to one end of a reciprocable rod, and defining a frusto-conical upper portion arranged to extend within the central opening of said discharge head;
    d) said reciprocable rod being attached at its opposite end to a piston;
    e) a cylinder head assembly including an enclosed cylinder for operatively receiving said piston;
    f) means for preselecting and maintaining axial spacing of said reciprocal cap relative to said central opening;
    g) said enclosed cylinder assembly, said cap and said discharge head assembly being positioned in relative axial alignment;
    h) said cylinder being provided with an opening on each side of said piston;
    i) a source of pressurized control fluid connectable to each of said cylinder openings; and
    j) means to selectively direct the flow of said pressurized control fluid to a cylinder opening located at a respective side of said piston.

2. A valve according to claim 1, wherein said source of pressurized control fluid is provided with control means to vary the amount of pressure thereof.

3. A valve according to claim 1, wherein said control means comprises a reversible valve connected to said control fluid source arranged to reciprocably pressurize and exhaust said control fluid controlling reciprocable movement of said piston, and valve opening means.

4. A valve according to claim 2, wherein said pressurized control means is pneumatically operated.

5. A valve according to claim 2, wherein said pressurized control means is hydraulically operated.

6. A valve according to claim 3, wherein said reversible valve is operated by an electromagnetic remotely operated solenoid.

7. A valve according to claim 1, wherein said axial spacing means comprising a plate member and a base member axially spaced from said plate member and containing said central fluid discharge opening, said plate and base members defining opposite ends of said discharge head assembly.

8. A valve according to claim 1, wherein said axial spacing means comprises axially spaced plate members defining opposite ends of said cylinder head assembly and cylinder member seated between said plate members; and a plurality of cylinder head spacer members, said spacer members and said cylinder member being of preselected length, whereby the axial spacing between said reciprocable cap and said central opening may be varied to a preselected axial length.

* * * * *